United States Patent [19]

Petitto, Sr. et al.

[11] 4,199,299

[45] Apr. 22, 1980

[54] MATERIAL HANDLING APPARATUS FOR USE IN A MINE

[75] Inventors: Angelo S. Petitto, Sr.; Angelo A. Petitto; James L. Petitto, all of Morgantown, W. Va.

[73] Assignee: Petitto Mine Equipment Repair, Inc., Morgantown, W. Va.

[21] Appl. No.: 867,904

[22] Filed: Jan. 9, 1978

[51] Int. Cl.[2] .......... B60P 1/54

[52] U.S. Cl. .......... 414/687; 414/718; 414/785

[58] Field of Search .......... 214/1 MS, 130 R, 131 R, 214/132, 133, 141; 294/82 R, 83; 414/680, 685, 687, 688, 718, 785

[56] References Cited

U.S. PATENT DOCUMENTS

| | | | |
|---|---|---|---|
| 2,890,905 | 6/1959 | Peters | 294/82 R X |
| 2,949,201 | 8/1960 | MacAlpine et al. | 214/657 |
| 3,061,122 | 10/1962 | Robbins | 214/132 |
| 3,226,857 | 1/1966 | Porter et al. | 214/131 X |
| 3,652,116 | 3/1972 | Pruitt | 294/82 R |
| 3,991,886 | 11/1976 | Thorsell | 214/1 MS |

FOREIGN PATENT DOCUMENTS

| | | | |
|---|---|---|---|
| 2328207 | 12/1973 | Fed. Rep. of Germany | 214/132 |
| 644056 | 10/1950 | United Kingdom | 214/132 |

*Primary Examiner*—L. J. Paperner
*Attorney, Agent, or Firm*—Stanley J. Price, Jr.; John M. Adams

[57] ABSTRACT

A self-propelled vehicle maneuverable in an underground mine includes an elongated mobile body having a forward end portion with a boom assembly mounted thereon. The boom assembly includes a pair of sections that are telescopically arranged to effect a change in the length of the boom. The outer end portion of the boom carries a material handling device which is operable to perform lifting, towing, recovery and other material handling operations in the mine. A pivot arrangement supports the boom assembly for lateral swinging movement on the front end of the mobile body. A pair of double-acting piston cylinder assemblies are mounted on the mobile body and are connected to the pivot arrangement for laterally swinging the boom assembly. The boom assembly is also connected to the pivot arrangement for upward and downward pivotal movement independent of the lateral swinging movement by operation of a lift cylinder. With this arrangement the boom assembly is extensible and movable laterally and vertically to move the material handling device to safely and efficiently perform a variety of material handling operations conducted in an underground mine.

11 Claims, 7 Drawing Figures

MATERIAL HANDLING APPARATUS FOR USE IN A MINE

BACKGROUND OF THE INVENTION

1. Field of the Invention

This invention relates to a material handling vehicle for use in underground mining operations and more particularly to a self-propelled mine vehicle having a telescoping boom member that is arranged to position a material handling device secured to the end of the boom member in a preselected lateral and vertical position for performing material handling operations in a mine.

2. Description of the Prior Art

In underground mining operations it is the customary practice to move equipment and materials into and out of the mine by conventionally known methods using devices such as chains, pulleys, hoists and the like. Particularly in the assembly and disassembly of longwall mining systems various components such as pans, cribbing, roof supports and conveyors must be transported into the mine entry and maneuvered into position adjacent the mine face. This requires a number of material handling operations which require the coordinated effort of the erection crew. In a mine where the working area is limited and the visibility is restricted, substantial precautions must be taken in coordinating the movement of men and materials in order to prevent serious injury to operating personnel. Such is the case when material and equipment are towed into position by conventional block and tackle means extending a considerable distance in the mine where the conditions make it difficult for the operator of the prime mover to make certain that the entry is clear before the equipment is moved. Consequently, due to the disadvantages of conventional known material handling devices and methods that are utilized in the mine, serious injuries to operating personnel have occurred while moving equipment in the mine.

Therefore, there is need for a multipurpose, self-propelled material handling device that is maneuverable in a mine to safely and efficiently perform a variety of material handling operations.

SUMMARY OF THE INVENTION

In accordance with the present invention there is provided a material handling vehicle for use in an underground mine that includes a mobile body and a boom assembly that extends from the mobile body. The boom assembly has a first end portion positioned adjacent the mobile body and a second end portion spaced from the first end portion and extending from the mobile body. A pivot arrangement pivotally supports the boom assembly first end portion on the mobile body. A first actuating device is mounted on the mobile body and is connected to the pivot arrangement for pivoting the boom assembly laterally relative to the mobile body. Connecting apparatus is provided to secure the boom assembly first end portion to the mobile body to permit upward and downward movement of the boom assembly relative to the mobile body. A second actuating device is supported by the pivot means and is connected to the boom assembly for raising and lowering the boom assembly. With this arrangement the boom assembly is moved upwardly and downwardly independently of the pivotal movement of the boom assembly on the mobile body. A material engaging device is connected to the boom assembly second end portion and is operable to engage material to be lifted and moved by the boom assembly.

The boom assembly first end portion is formed by an elongated channel-shaped member that is pivotally secured by the connecting apparatus to the pivot arrangement. The channel-shaped member is pivotal through a vertical plane about a horizontal axis formed by the pivot arrangement. The boom channel-shaped first end portion has an open end opposite the end that is pivotally connected to the pivot arrangement. The boom assembly second end portion extends through this open end in a manner to permit slidable movement of the boom assembly second end portion relative to the boom assembly first end portion.

The boom assembly second end portion also has an elongated channel-shaped configuration similar to the boom assembly first end portion. The cross sectional area of the boom assembly first end portion is greater than that of the boom assembly second end portion to permit extension and retraction of the second end portion relative to the first end portion. A piston cylinder assembly is disposed within the boom assembly second end portion and is secured at its end portions to the respective portions of the boom assembly. With this arrangement actuation of the piston cylinder assembly is operable to move the boom assembly second end portion in a telescoping manner relative to the boom assembly first end portion and thereby change the effective length of the boom member.

The material engaging device is securely engaged to the outer end portion of the boom assembly second end portion. Preferably, the device includes a hook member rotatably positioned within a socket that is pivotally connected to a bracket member secured to the end of the boom assembly. The hook member is operable to assist in performing a number of lifting and moving operations in a more efficient manner than presently available with conventional apparatus and methods now used in underground mining operations.

The pivot arrangement includes a pin member that is preferably secured to a frame member that projects forwardly of the mobile body. A pivot housing surrounds the pin member and includes outwardly extending portions that are connected to a pair of piston cylinder assemblies that are pivotally mounted on the mobile body. The boom assembly first end portion is connected for pivotal movement about a horizontal axis to the pivot housing. Upon the coordinated extension and retraction of the pair of piston cylinder assemblies, the pivot housing is pivoted about the vertical axis of pin member to, in turn, pivot the boom assembly about the vertical axis of the pin member. This arrangement permits the boom assembly to be swung laterally about the pin member at the forward end portion of the mobile body.

The swinging movement of the boom assembly is accomplished independently of the upward and downward movement of the boom assembly. Upward and downward movement of the boom assembly is accomplished by operation of the second actuating device which preferably includes a piston cylinder assembly connected at one end to the pin member of the pivot arrangement and at the opposite end to the boom assembly first end portion. Extension and retraction of the second actuating device effects upward and downward movement of the entire boom assembly. By extending the boom assembly a preselected length, the material engaging device at the end of the boom assembly is moved to a preselected height relative to the mobile body. This movement is coordinated with the lateral swinging movement of the boom assembly to position the material engaging device at a preselected vertical and lateral position at the front of the mobile body.

The mobile body is propelled by ground traction devices which are driven by a suitable prime mover. An operator's station provided on the mobile body safely positions an operator for controlling tramming of the vehicle and the lateral and upward and downward movement of the boom assembly to perform a number of material handling operations.

Accordingly, the principal object of the present invention is to provide a material handling vehicle operable in underground mining operations and including a boom assembly that is positioned for upward and downward and lateral swinging movement on a mobile body to facilitate efficient handling of material and equipment in an underground mine.

Another object of the present invention is to provide a self-propelled mine vehicle that is maneuverable to a preselected location in an underground mine and is operable by a telescoping-type boom member to perform material handling operations by laterally swinging and raising and lowering the boom member.

A further object of the present invention is to provide a self-propelled mine recovery vehicle in which an operator is safely positioned on the vehicle to operate a telescoping-type boom member arranged to move a material handling device horizontally and vertically to preselected positions in performing material handling operations in the mine.

These and other objects of the present invention will be more completely disclosed and described in the following specification, the accompanying drawings and the appended claims.

DESCRIPTION OF THE PREFERRED EMBODIMENT

Figure 1:
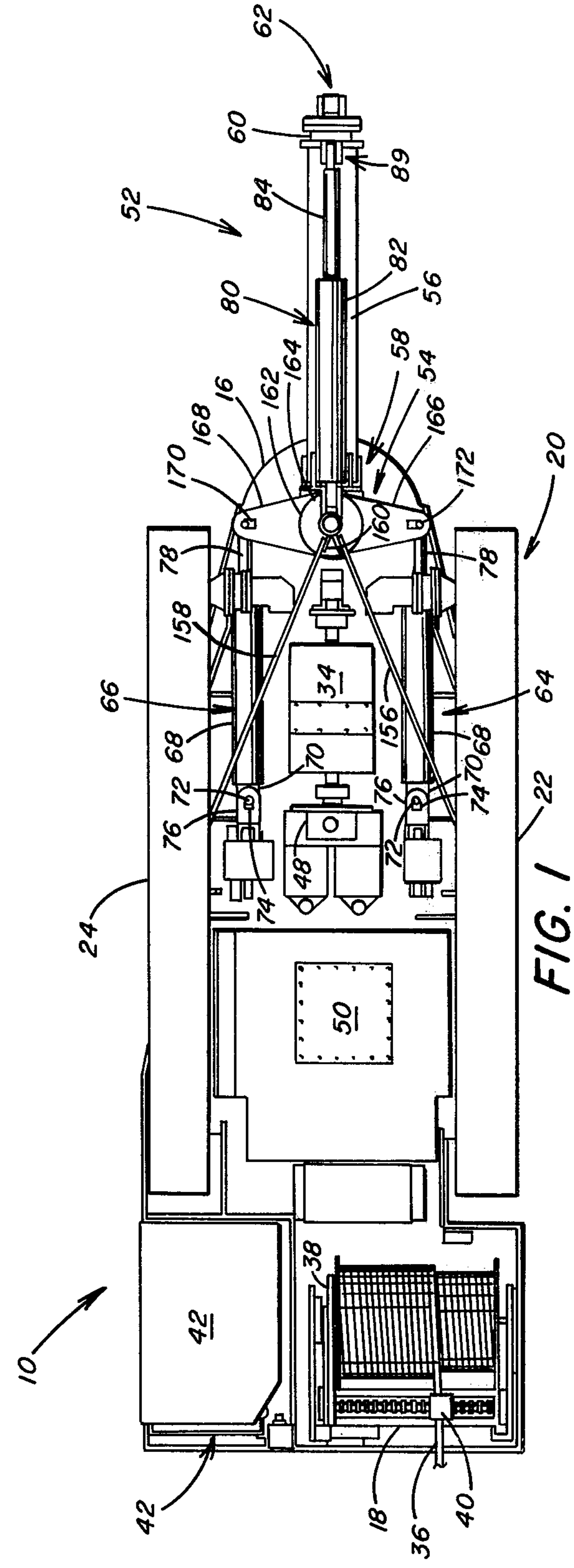
FIG. 1 is a top plan view of a self-propelled vehicle for use in underground mining operations for performing material handling operations, illustrating a telescoping boom assembly having a material engaging device secured to the end portion thereof and movable upwardly and downwardly and laterally on the vehicle.
Figure 2:
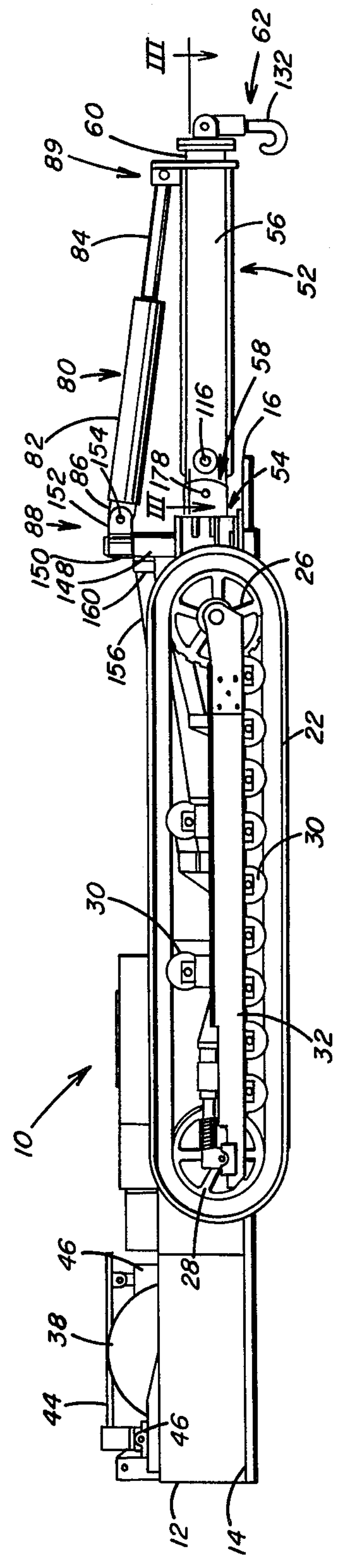
FIG. 2 is a view in side elevation of the material handling vehicle shown in FIG. 1, illustrating the boom assembly in a retracted position and extending substantially horizontally and forwardly of the vehicle.

Referring to the drawings, and particularly to FIGS. 1 and 2, there is illustrated a material handling vehicle generally designated by the numeral 10 for use in underground mining operations or in any type of underground excavation work. The material handling vehicle 10 includes a mobile body portion 12 having a longitudinally extending frame 14. The frame 14 has a front end 16 and a rearward end 18. The frame 14 of the mobile body 12 is mounted on ground engaging traction devices 20, such as a pair of propelling endless tracks 22 and 24. Each of the tracks 22 and 24 are reeved about a drive sprocket 26 and an idler sprocket 28 with idler rollers 30 supported by a frame 32 that extends between and is connected to the sprockets 26 and 28. The idler rollers 30 support the upper and lower reaches of the endless track as it turns in a preselected direction upon rotation of the driven sprocket 26.

The drive sprocket 26 for each endless track 22 and 24 is drivingly connected, in a manner not shown, to a suitable prime mover 34, such as an electric motor which is secured to vehicle frame 14. Electrical power is supplied to the motor 34 through an electrical cable 36 wound upon a cable reel 38 by a spooling device 40. The cable reel 38 is mounted on the rearward end 18 of the frame 14 adjacent an operator's station generally designated by the numeral 42. The operator's station includes an overhead canopy 44 that is raised and lowered by piston cylinder assemblies 46 as determined by the overhead clearance provided between the top of the vehicle 10 and the mine roof. The operator's station is provided with controls for propelling and steering the vehicle, as well as for carrying out the material handling operations performed by the vehicle 10 in accordance with the present invention.

The motor 34 is also employed for operating a fluid pump 48 that supplies fluid under pressure to the various fluid operated devices on the vehicle 10, such as the fluid actuated piston cylinder assemblies provided on the mobile body 12 and to be described later in detail. The fluid pump 48 supplies fluid, such as hydraulic oil, from a tank 50 mounted on the frame 12 through conventional hydraulic conduits (not shown) to the various fluid operating devices. The controls for supplying fluid to the fluid operated devices are provided at the operator's station 42, together with the electrical controls by which the speed and direction of movement of the vehicle 10 is controlled.

A telescoping boom assembly, generally designated by the numeral 52, extends forwardly from the front end 16 of frame 14 and is supported thereon by a pivot arrangement 54 for carrying out lateral swinging movement of the boom assembly 52. The boom assembly 52 includes a first portion 56 that is secured to the pivot arrangement 54 by connecting apparatus 58 in a manner to facilitate upward and downward movement of the entire boom assembly 52. A second end portion 60 of the boom assembly 52 is extensible out of and into the boom first end portion 56 and includes at its outer end portion a material engaging device, generally designated by the numeral 62. As will be described in greater detail, material engaging device 62 is utilized to perform a number of material handling operations encountered in underground mining.

The material handling device 62 is moved by boom assembly 52 relative to the mobile body 12. Lateral movement of the boom assembly 52 is accomplished through the pivot arrangement 54 by operation of a pair of fluid actuated devices, such as piston cylinder assemblies 64 and 66. Each of the assemblies 64 and 66 includes a cylinder portion 68. The cylinder portion 68 includes a connecting end portion 70 having a lug 72 extending upwardly therefrom, in which the lug is received within a longitudinal slot 74 of a bracket member 76. The bracket member 76 is securely mounted to the vehicle frame 14. This arrangement provides for pivotal movement of the cylinder portion 68 during its operation. The opposite end portion of each of the assemblies 64 and 66 includes a piston rod 78 that is extensible from the cylinder portion 68 and is secured at its outer end portion to the pivot arrangement 54.

The piston cylinder assemblies 64 and 66 are operable in pairs to effect lateral swinging movement of the boom assembly 52 at the front end 16 of frame 14. Thus in a manner to be explained further in greater detail to swing the boom assembly 52 laterally in a clockwise direction on the frame 14, assembly 66 is actuated to extend its piston rod 78 from the cylinder 68; while the piston rod 78 associated with assembly 64 is retracted into the cylinder portion 68. Preferably, a single control is operable to effect the coordinated extension and retraction of the piston rods of the assemblies 64 and 66. Conversely, to swing the boom assembly 52 laterally in a counterclockwise direction the piston rod of assembly 64 is extended and the piston rod of assembly 66 is simultaneously retracted.

Independently of the laterally swinging movement of the boom assembly 52, the boom assembly is also operable to move upwardly and downwardly to position the material gathering device 62 at a preselected elevation relative to the frame 14 or relative to the mine floor and roof. Upward and downward movement of the boom assembly 52 is accomplished by a fluid actuated device, such as piston cylinder assembly 80 having a cylinder portion 82 and a piston rod 84 movable into and out of the cylinder portion 82. The cylinder portion 82 is pivotally connected at its end portion 86 by a clevis-type connection 88 to the pivot arrangement 54. The outer end of the piston rod 84 is also connected by a clevis-type connection 81 to the boom assembly 52 and more specifically to the outer end of the boom assembly first end portion 56. With this arrangement extension and retraction of the piston rod 84 is operable to move the boom assembly 52 together with the material handling device 62 upwardly and downwardly as the end portion of the boom assembly 52 adjacent the pivot arrangement 54 pivots about the connecting apparatus 58 that connects the boom assembly 52 to the pivot arrangement 54. Thus the boom assembly 52 is movable both vertically and laterally in an arcuate path at the front end of the mobile body 12.

Figure 3:
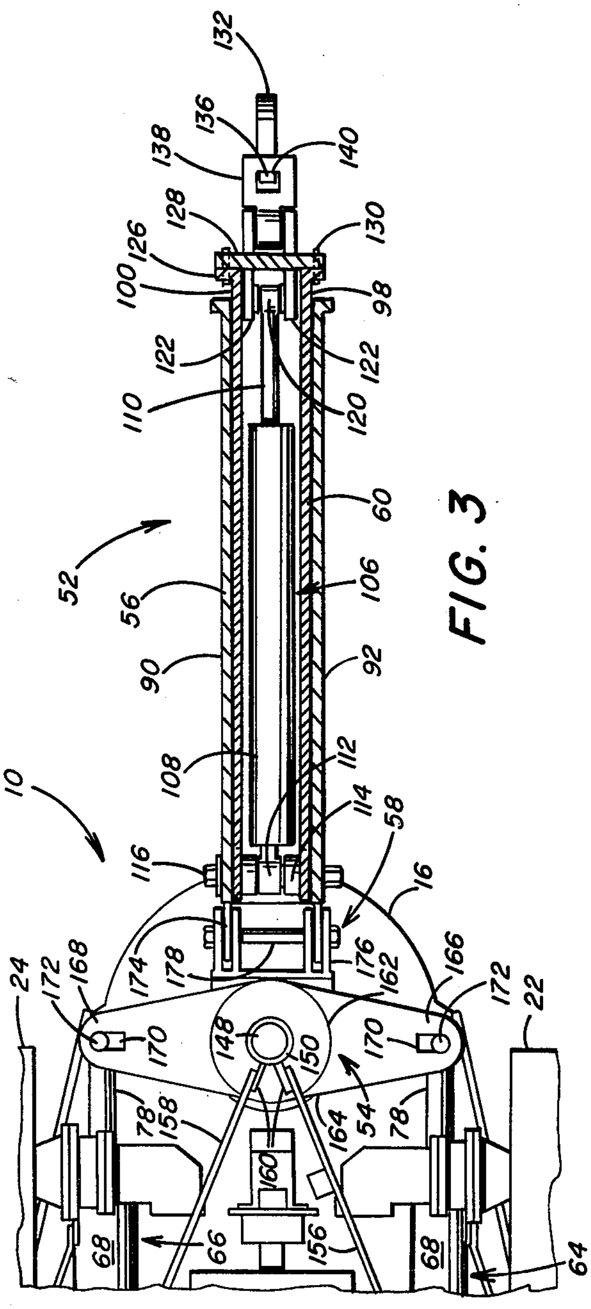
FIG. 3 is a fragmentary plan view, partially in section taken along line 3—3 of FIG. 2, illustrating a piston cylinder assembly housed within the boom assembly and operable to extend and retract the boom assembly to position the material engaging means a preselected distance from the vehicle.
Figure 4:
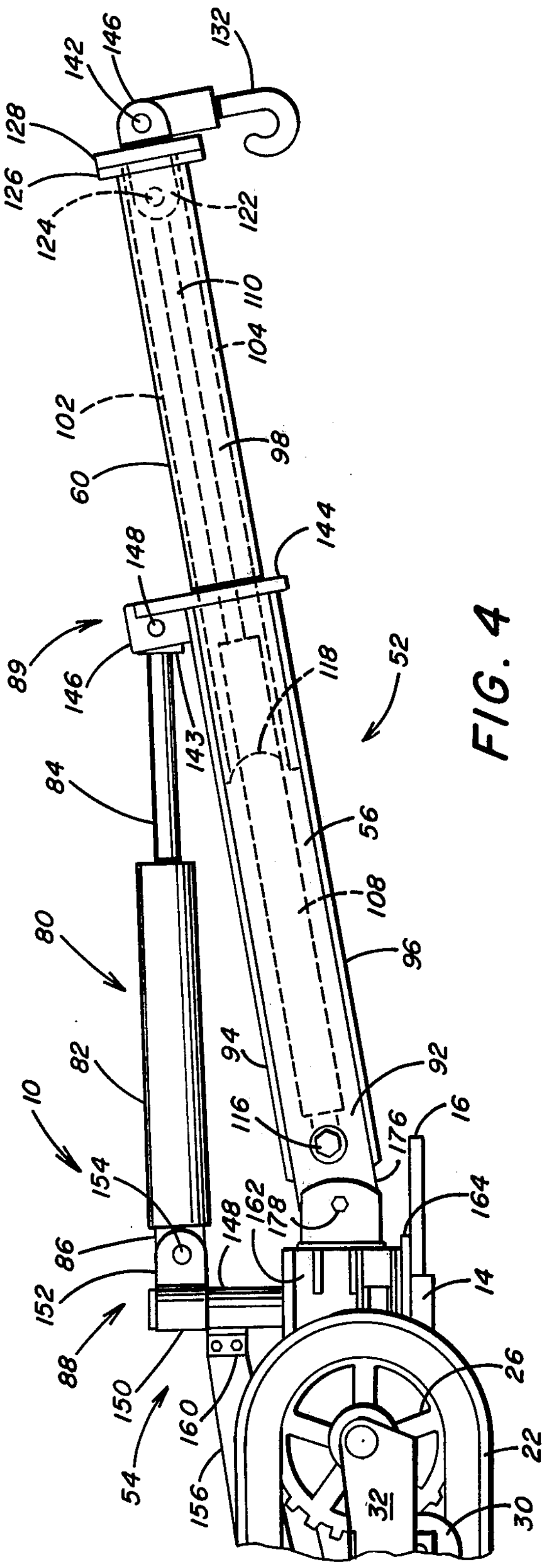
FIG. 4 is a fragmentary view in side elevation of the front end of the material handling vehicle, illustrating in phantom the piston cylinder assembly for extending the boom assembly and the piston cylinder assembly for raising and lowering the boom assembly.

Referring to FIGS. 3 and 4 there is illustrated in greater detail the construction of the boom assembly 52 and the manner in which the boom assembly is extended and retracted. As stated hereinabove, the boom assembly first end portion 56 has a channel configuration formed by laterally spaced side plates 90 and 92 which are suitably connected to a top plate 94 and a bottom plate 96. The top plate 94 has been removed in FIG. 3 for purposes of illustration. This arrangement forms a rectangular shaped channel for receiving the boom assembly second end portion 60. The second end portion 60 has laterally spaced side plates 98 and 100 connected to laterally spaced top and bottom plates 102 and 104 respectively. The plates 98–104 thus form a rectangular shaped channel having a cross-sectional area which is less than the cross-sectional area formed by the plates of the boom assembly first end portion 56. This permits slidable movement of the boom assembly second end portion 60 relative to the boom assembly first end portion 56 to provide the telescoping feature of the boom assembly 52.

In FIG. 3, the boom assembly second end portion 60 is shown retracted within the boom assembly first end portion 56 and the top plates 94 and 102 removed to illustrate a fluid actuated device, such as piston cylinder assembly 106. The assembly 106 is operable upon actuation to extend and retract the second end portion 60 relative to the first end portion 56 and thereby change the effective length of the boom assembly 52. The assembly 106 includes a piston cylinder 108 and an extensible piston rod 110. The cylinder 108 has an end portion 112 with a bore therethrough, and the end portion 112 is aligned with a pair of coaxially positioned bosses 114. The bosses 114 are secured to the inner surfaces of side plates 90 and 92. A pin member 116 extends through aligned bores of the side plates 90 and 92, the bosses 114 and the end portion 112. With this arrangement the end portion of the piston cylinder assembly 106 is secured for movement with the boom assembly first end portion 56.

It is to be noted, as illustrated in FIG. 4, that the ends of side plates 98 and 100 of the boom assembly second end portion 60 are provided with arcuate recesses 118. With this arrangement the recesses 118 permit the boom second end portion 60 to be fully retracted within the boom first end portion 56 without interference by the pin 116 at the inner end of the boom second end portion 60.

The outer end of the piston rod 110 of assembly 106 includes an enlarged end portion 120 having a bore therethrough, which is aligned with bores extending through a pair of ears 122. The ears 122 are secured to the boom second end portion 60. A pin 124, illustrated in FIG. 4, extends through aligned bores of rod end portion 120 and ears 122 to secure the piston rod 110 to the boom second end portion 60. Thus upon actuation of the piston cylinder assembly 106, extension of the piston rod 110 from the cylinder 108 extends the boom second end portion 60 relative to the boom first end portion 56. Accordingly, retraction of the piston rod 110 into the cylinder 108 retracts the boom second end portion 60 into the boom first end portion 56. In this manner the boom assembly 52 is adjustable to a preselected length.

Figure 6:
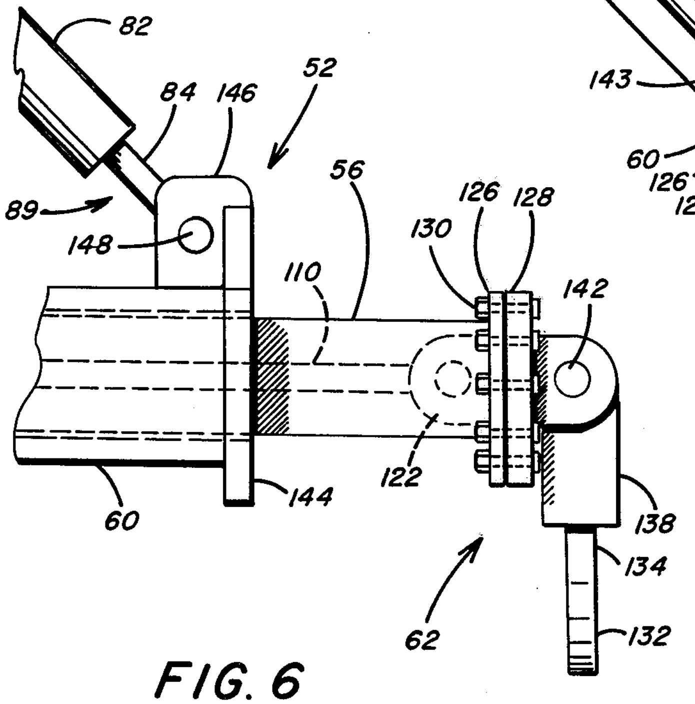
FIG. 6 is a fragmentary view in side elevation of the boom assembly, illustrating the boom assembly in a retracted position and a hook member which comprises the material engaging device and is secured to the end of the boom assembly.
Figure 7:
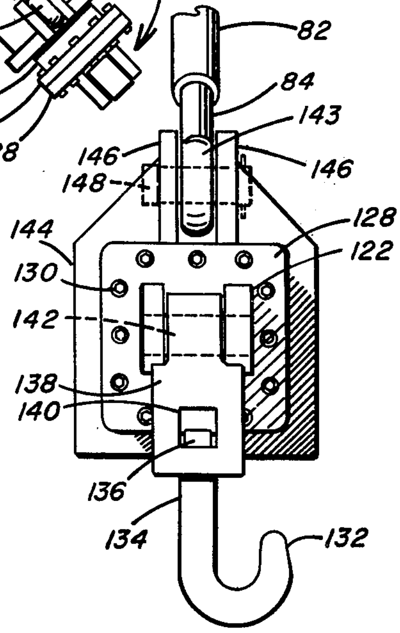
FIG. 7 is a fragmentary end view of the boom assembly shown in FIG. 6, illustrating the arrangement for pivotally and rotatably connecting the hook member to the end of the boom assembly.

As illustrated in FIGS. 3 and 4 and in greater detail in FIGS. 6 and 7, the material handling device 62 is secured to the outer end of the boom assembly second end portion 60. The outer end of the boom assembly second end portion 60 includes a plate member 126 that is suitably secured to the side plates 98 and 100 and the top and bottom plates 102 and 104. A plate 128 is secured by bolts 130 to the plate 126. The pair of ears 122 extend through aligned slots cut in plates 126 and 128 and are suitably welded thereto to secure the pair of ears 122 to the plates 126 and 128. The end portion of the ears 122 that extends beyond the plate 128 is connected to the material handling device 62.

The material handling device 62, as illustrated in FIGS. 6 and 7, includes a hook member 132 having a shank portion 134 extending upwardly from the hooked end with an enlarged end portion 136 at the upper end of the shank 134. The shank portion 134 extends through a bore of a retainer 138 having a socket 140 for receiving the end portion 136 so that the end portion 136 is rotatably positioned within the socket 140 to permit 360° rotation of the hook 132. The upper portion of the retainer 138 is pivotally connected by a pin 142 to the outer end of the pair of ears 122. The pin 142 extends through the bore of the retainer 138 and the bores of the ears 122 that extend beyond the plate member 128.

The hook member 132 may be swung upwardly and downwardly about the horizontal axis formed by the pin 142, as well as rotated about the axis of the shank 134. This arrangement provides a versatile means by which a number of lifting, pulling and other material handling operations may be performed. It should be understood, however, that the hook member 132 is only an illustration of one type of material handling device that may be incorporated in the present invention, and other suitable devices may be utilized with the present invention to perform various material handling operations encountered in underground mining operations.

As illustrated in greater detail in FIGS. 6 and 7, the piston rod 84 of piston cylinder assembly 80 is connected as above discussed to the outer end of the boom assembly first end portion 56 by the clevis-type connection 89. The connection 89 includes an enlarged end portion 143 of the end of piston rod 84. A flange 144 extends around the end of the boom assembly first end portion 56 and includes an upper end portion with a pair of laterally spaced projections 146 having aligned bores therethrough. The piston rod end portion 143 includes a bore which is axially aligned with the bores of projections 146 so as to permit a pin 148 to be extended through the aligned bores to thereby secure the piston rod end portion 143 to the projections 146 and thereby connect the end of the piston cylinder assembly 80 to the boom assembly 52.

The cylinder portion 82 of the assembly 80 is connected by the clevis-type connection 88 to the pivot arrangement 54. The pivot arrangement 54 includes a vertically extending pin 148 that is secured at its lower end portion to the front end 16 of mobile body frame 14. The connection 88 includes a collar 150 that is positioned in surrounding relation with the upper end portion of pin 148 and rotatable relative thereto. A pair of ears 152 of the collar 150 extend forwardly from the pin and the end 86 of cylinder portion 82 is positioned between the ears 152 so that bores extending through the ears and cylinder end portion 86 are aligned to receive a pivot pin 154. In this manner the cylinder portion 82 is connected to the collar 150, and the collar 150 is arranged to pivot about the pin 148 to permit the piston cylinder assembly 80 to move laterally with the boom assembly 52 upon actuation of the piston cylinder assemblies 64 and 66.

The pivot pin 148 is securely mounted to the front end 16 of mobile body frame 14 by a pair of brace members 156 and 158. One end of each brace member 156 and 158 is secured to the frame 14 and the opposite end portion is suitably secured to a plate member 160 that is secured as by welding to the pin member 148 and extends rearwardly therefrom. The end portions of the brace members 156 and 158 may be secured to the plates 160 by bolting. With this arrangement the pivot pin 148 is securely supported in a vertical position on the front end 16 of the mobile body frame 14.

A swivel housing 162 surrounds the lower end portion of the pivot pin 148 and includes a base member 164 that is movably positioned on the frame 14 to permit pivoting of the housing 162 about the pivot pin 148. The base member 164 includes outwardly extending end portions 166 and 168. The end portions 166 and 168 are connected to the end portions of piston rods 78 of the piston cylinder assemblies 64 and 66 respectively.

Each of the base member portions 166 and 168 includes an elongated slot 170 arranged to receive a pin 172 that is secured to and extends upwardly from the end portion of each of the piston rods 78. With this arrangement the pins 172 are movable in the slots 170 to permit the piston cylinder assemblies 64 and 66 to pivot relative to the base member portions 166 and 168 as the assemblies are extended and retracted to pivot the base member 164 and swing the boom assembly 52 laterally on the frame 14.

Figure 5:
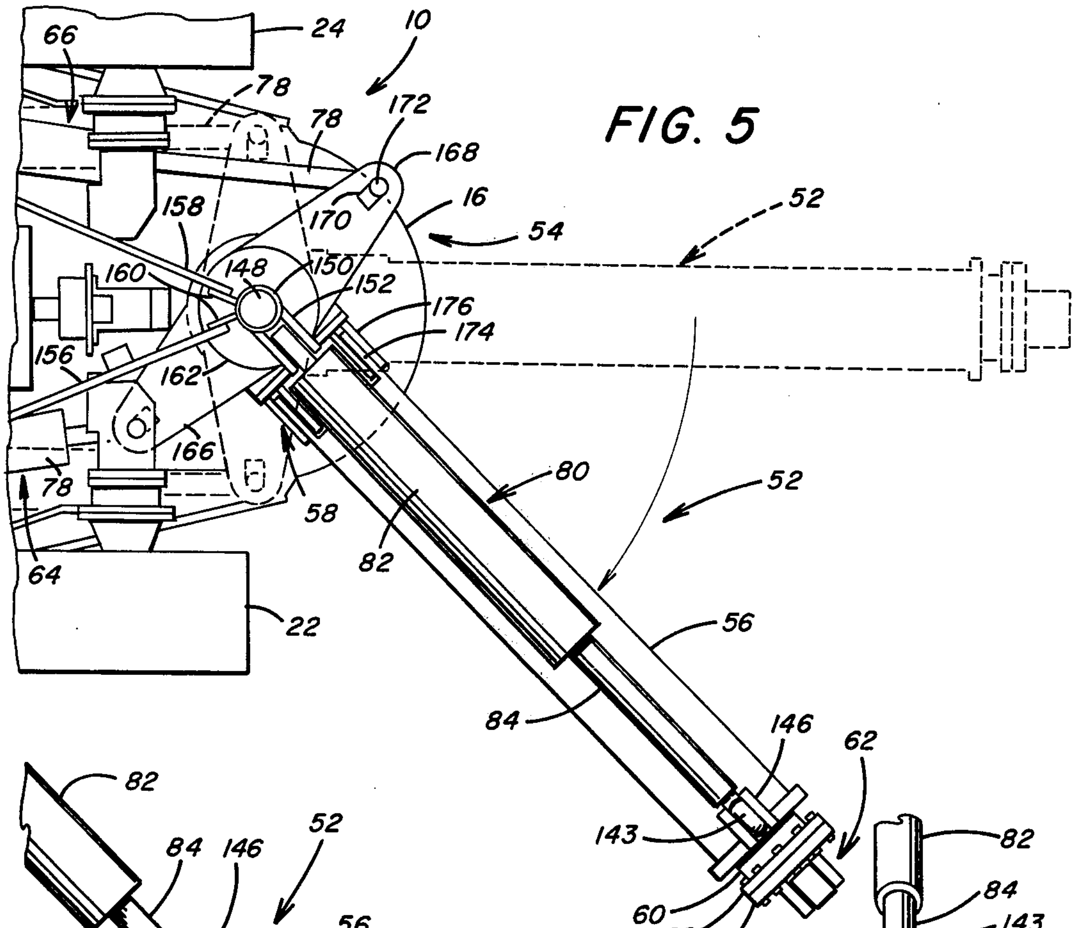
FIG. 5 is a fragmentary top plan view of the front end of the material handling vehicle, illustrating the boom assembly pivoted laterally in a retracted position from a position illustrated in phantom.

The lateral swinging movement of the boom assembly 52 by operation of the pivot arrangement 54 is illustrated in greater detail in FIG. 5 where the boom assembly 52 is illustrated in phantom extending forwardly from the frame 14 in a position aligned with the longitudinal axis of the frame 14. Actuation of the piston cylinder assemblies 64 and 66 pivots the boom assembly 52 in a clockwise direction from the position illustrated in phantom by extension of the piston rod of assembly 66 and retraction of the piston rod of assembly 64. Extension and retraction of the respective assemblies takes place simultaneously. The cylinder portions 68 of each assembly pivot about their connections to the mounting brackets 76 as the piston rods 78 are extended and retracted and the housing 162 pivots about the pivot pin 148. As the boom assembly 52 pivots about the vertical axis formed by pivot pin 148, the piston cylinder assembly 80 connected at one end to the boom assembly 52 pivots at its opposite end about the pivot pin 148.

The boom assembly 52 is also arranged for upward and downward pivotal movement about a horizontal pivotal axis formed by the connection of the boom assembly 52 to the pivot arrangement 54. This connection is illustrated in detail in FIGS. 3 and 4. The end of the boom assembly first end portion 56 adjacent the vertical pivot pin 148 includes a pair of rearwardly projecting portions 174 that are received within slots formed by a conventional clevis 176. The clevis 176 extends forwardly from the pivot housing 162. The projection portions 174 and clevis 176 have aligned bores for receiving a pivot pin 178 that is securely retained within the aligned bores in a conventional manner. With this arrangement the boom assembly first end portion 56 is arranged to pivot about the horizontal axis formed by the pivot pin 178 upon actuation of the piston cylinder assembly 80.

As illustrated in FIG. 4, retraction of the piston rod 84 into the cylinder portion 82 pivots the entire boom assembly 52 upwardly about the pivot pin 178 to thereby raise the hook member 132 at the end of the boom assembly second end portion 60. Lowering the boom to the position illustrated in FIG. 2 is accomplished by extending the piston rod 84 from the cylinder portion 82. As discussed hereinabove the upward and downward pivotal movement of the boom assembly 52 is accomplished independently of the lateral swinging movement of the boom assembly 52. In this manner the hook member 132 is selectively positioned at a preselected elevation and at a preselected lateral position relative to the mobile body frame 14.

Thus, in operation for example in moving the components of a longwall mining system into position at the mine face, the boom assembly 52 is safely and efficiently operated to position the hook member 132 for engaging the piece of equipment to be moved. Movement of the equipment is accomplished by tramming of the vehicle 10 where the vehicle operator has a clear view of the equipment to control its movement in a safe manner through the mine. At all times movement of the boom assembly 52 and the vehicle 10 is controlled by the operator from the protected operator's station 52. This arrangement substantially reduces the hazards encountered with conventional material handling devices and techniques used in the past in underground mining operations.

According to the provisions of the Patent Statutes, we have explained the principle, preferred construction and mode of operation of our invention and have illustrated and described what we now consider to represent its best embodiments. However, it should be understood that, within the scope of the appended claims, the invention may be practiced otherwise than as specifically illustrated and described.

We claim:

1. A material handling vehicle for use in an underground mine comprising, a mobile body, a boom assembly extending from said mobile body, said boom assembly having a first end portion adjacent said mobile body and a second end portion spaced from said first end portion and extending from said mobile body, a pivot pin secured to said mobile body and extending upwardly therefrom, said boom assembly first end portion being pivotally connected to said upwardly extending pivot pin, first actuating means mounted on said mobile body and connected to said pivot pin for pivoting said boom assembly laterally relative to said mobile body, first connecting means for securing said boom assembly first end portion to said mobile body to permit upward and downward movement of said boom assembly relative to said mobile body, second actuating means being connected at one end to said upwardly extending pivot pin and connected at the other end to said boom assembly first end portion for raising and lowering said boom assembly to effect upward and downward movement of said boom assembly independent of the pivotal movement of said boom assembly, material engaging means connected to the boom assembly second end portion for engaging material to be lifted and moved by said boom assembly, said material engaging means including a hook member having an elongated shank and a hooked end portion, a retainer pivotally connected to said boom assembly second end portion for upward and downward pivotal movement about a horizontal axis, said retainer having a socket for rotatably receiving said hook member shank, said hook member being supported by said retainer for rotational movement about the elongated axis of said shank, second connecting means for connecting said retainer to said boom member second end portion, said second connecting means being secured to said boom member second end portion, extensible means for extending and retracting said boom assembly second end portion relative to said boom assembly first end portion, and said extensible means having an end portion secured to said second connecting means.

2. A material handling vehicle as set forth in claim 1 which includes, ground traction means connected to said mobile body for propelling said mobile body in the mine, said mobile body having a front end portion and a rear end portion, and said boom assembly extending forwardly from the said front end portion.

3. A material handling vehicle as set forth in claim 1 which includes, said mobile body having a frame member with a forwardly extending portion, said pivot pin being positioned on said frame member forwardly extending portion, and said boom assembly being supported by said pivot pin for lateral swinging movement forwardly of said frame member forwardly extending portion.

4. A material handling vehicle as set forth in claim 1 which includes, ground traction means connected to said mobile body for propelling said mobile body in the mine, a longitudinally extending frame supported by said mobile body, a prime mover mounted on said frame and drivingly connected to said ground traction means, said frame having a forward end portion and a rear end portion, said pivot pin being positioned at said frame forward end portion and extending upwardly therefrom, said boom assembly first end portion being connected to said pivot pin and said boom assembly second end portion extending forwardly from said frame forward end portion, said second actuating means extending forwardly from said frame forward end portion in overlying relation with said boom assembly first end portion, and an operator's station positioned on said frame for controlling tramming of said mobile body and movement of said boom assembly.

5. A material handling vehicle as set forth in claim 1 in which, said boom assembly includes a first elongated boom member connected to said mobile body by said pivot pin for lateral swinging movement relative to said mobile body, said boom assembly including a second elongated boom member telescopically supported by said first boom member, said second boom member being arranged to extend and retract relative to said first boom member to thereby change the effective length of said boom assembly, and means for securing said material engaging means to said second boom member.

6. A material handling vehicle as set forth in claim 1 in which, said boom assembly includes a first boom member and a second boom member, said second boom member being longitudinally movable relative to said first boom member for extending said boom assembly to a preselected length, said first boom member being pivotally connected to said pivot pin for pivotal movement about a horizontal axis to effect upward and downward movement of said boom assembly and thereby position said engaging means at a preselected elevation relative to said mobile body, said second actuating means being connected at one end to said pivot pin and at the opposite end to said first boom member, and said second actuating means being aligned longitudinally with said boom assembly and operable to raise and lower said first and second boom members.

7. A material handling vehicle as set forth in claim 1 in which, said boom assembly includes a first boom member and a second boom member, said first boom member being connected to said pivot pin on said mobile body for upward and downward pivotal movement, said second boom member having one end portion slidably supported by said first boom member and an opposite end portion extending from said first boom member, said extensible means connected to said first boom member and at the opposite end to said second boom member opposite end portion, and said extensible means being operable to extend and retract said second boom member relative to said first boom member and thereby change the effective length of said boom assembly.

8. A material handling vehicle as set forth in claim 1 in which, said pivot pin is secured to said mobile body and extends upwardly therefrom to form a pivotal axis, a housing surrounding said pivot pin and arranged to pivot about said pivotal axis thereof, said housing having a base member movably positioned on said mobile body, said boom assembly being connected to said base member for pivotal movement therewith, and said first actuating means being connected to said base member and operable upon actuation to pivot said base member about said pivot pin and thereby swing said boom assembly laterally relative to said mobile body.

9. A material handling vehicle as set forth in claim 1 in which, said first connecting means includes a pin member connecting said boom assembly first end portion to said pivot pin, said pin member forming a horizontal axis for pivotal movement of said boom assembly in a vertical arcuate path, said second actuating means being pivotally connected to said pivot pin for pivotal movement with said boom assembly in a horizontal arcuate path, and said second actuating means being aligned longitudinally with said boom assembly and operable to position said boom assembly second end portion at a preselected vertical height.

10. A material handling vehicle as set forth in claim 1 in which, said boom assembly includes a first channel-shaped member having a first end connected to said mobile body for vertical and horizontal movement and a second end extending forwardly from said mobile body, said second actuating means being aligned with and extending longitudinally the length of said first channel-shaped member, means for connecting one end portion of said second actuating means to said first channel-shaped member second end, a second channel-shaped member having a first end portion slidably received within said first channel-shaped member and a second end portion extending longitudinally from said first channel-shaped member, a piston cylinder assembly positioned within said first and second channel-shaped members, said piston cylinder assembly having a cylinder end portion connected to said first end portion of said first channel-shaped member and an extensible end portion connected to said second end portion of said second channel-shaped member, and said piston cylinder assembly being operable to extend and retract said extensible end portion to extend and retract said second channel-shaped member relative to said first channel-shaped member and thereby change the length of said boom assembly.

11. A material handling vehicle as set forth in claim 1 in which said first connecting means includes, a pin member pivotally connecting said boom assembly first end portion to said pivot pin, and said pin member forming a horizontal pivotal axis to effect pivotal movement of said boom assembly about said horizontal pivotal axis in a vertical arcuate path.

* * * * *